United States Patent [19]
Fock et al.

[11] Patent Number: 5,565,520
[45] Date of Patent: Oct. 15, 1996

[54] POLYOLEFINS, POLYOLEFIN BLENDS AND ELASTOMER-MODIFIED POLYOLEFINS WITH INCREASED SURFACE POLARITY

[75] Inventors: Jürgen Fock, Düsseldorf; Günter Hahn, Mülheim; Arno Knebelkamp, Essen, all of Germany

[73] Assignee: TH. Goldschmidt AG., Essen, Germany

[21] Appl. No.: 457,919

[22] Filed: Jun. 1, 1995

[30] Foreign Application Priority Data

Jun. 3, 1994 [DE] Germany .................. 44 19 431.5

[51] Int. Cl.$^6$ .................. C08L 53/00; C08K 5/372
[52] U.S. Cl. .................. 525/94; 525/227; 525/299; 525/301
[58] Field of Search .................. 525/94, 299, 227, 525/301

[56] References Cited

PUBLICATIONS

Berlin et al., Stabilization of Acrylic Polymers, Vysoconiol. 80 edin., Ser. B 14 (10) 1972, pp. 736–40 (Russian).
Polypropylen–Reaktorblends, by H. Schwager, published by Carl Hanser Verlag, München 1992, 499–501. not translated.
Problemlösungen beim Lackieren von Polyprophylen–Blends, by Ch. Gruner, Köln, B. Rapp and H. J. Zimmermann, published by Carl Hanser Verlag, Kunststoffe 82 (1992) 9, 802–806. not translated.
Progress in Organic Coatings An International Journal, by W. Funke (Managing Editor in Germany), G. P. Bierwagen (Editor in USA), and A. L. Palluel (Editor in UK), Progress in Organic Coatings, 21, 269–284 (1993).
Encyclopedia of Polymer Science and Engineering, second Edition, Mark, Bikales, Overberger, Menges, vol. 6, 383–522.
Encyclopedia of Polymer Science and Engineering, Second Edition, Mark, Bikales, Overberger, Menges, vol. 6, 522–564.
Encyclopedia of Polymer Science and Engineering, Second Edition, Mark, Bikales, Overberger, Menges, vol. 13, 464–531.

Primary Examiner—Irina Zemel
Attorney, Agent, or Firm—Anderson, Kill, Olick P.C.

[57] ABSTRACT

Polyolefins, polyolefin blends and elastomer-modified polyolefins containing additives to increase the surface polarity are prepared. They contain AB block copolymers as additives. A method for preparation of polyolefins, polyolefin blends and elastomer-modified polyolefins with a polar surface is defined as well as the method of preparing the polyolefins articles.

4 Claims, No Drawings

POLYOLEFINS, POLYOLEFIN BLENDS AND ELASTOMER-MODIFIED POLYOLEFINS WITH INCREASED SURFACE POLARITY

FIELD OF INVENTION

The invention relates to polyolefins, polyolefin blends and elastomer-modified polyolefins having a polar surface, as well as a method for their production. The present invention also relates to the manufacture of molded articles and semi-finished products with increased surface polarity.

BACKGROUND INFORMATION AND PRIOR ART

The proportion of plastics in the automobile has risen greatly in recent years. Under the aspect of recycling plastics, however, endeavors are being made to limit the large number of plastics to indispensable few types. With this as background, it is understandable that polyolefins, particularly polypropylene, polypropylene copolymers and blends, with their broad spectrum of properties and good recycling capabilities, are preferably being used in the automobile sector.

Unfortunately, aside from their indisputably good properties, all polyolefin-based plastics, as described in the Encyclopedia of Polymer Science, second edition, 1985, volume 6, Ethylene Polymers (pages 383–522), Ethylene-Propylene Elastomers (pages 522–564) and volume 13, Propylene Polymers (pages 464–531), also have serious deficiencies, namely, their low free surface energy. The high hydrophobicity and crystallinity of polyolefins make the wetting and adhesion of less hydrophobic or hydrophilic materials difficult. This state of affairs become noticeable when the surface of these plastics is to be coated, printed, glued or foamed.

There has therefore been no lack of efforts to make the surface of polyolefin articles polar by special, subsequent treatments. The publication "Surface Treatments of Polyolefins" (Progress in Organic Coatings, 21, (1993) 269–284, J. M. Lane and D. J. Hourston) provides a survey of the most common methods of treatment for increasing the surface energy of polyolefins, namely corona discharge;

plasma treatment;

flaming;

chemical etching;

fluorinating; and ozonization and photooxidative treatment.

The most common pretreatment method is flaming. Monitoring this process creates problems, since basically it does not offer 100% reliability, as even small defects can cause severe adhesion disorders. Some risk of fire and the necessary clean room atmosphere signify additional expenses. The processing of milled, recycled material (rejected parts or scrap coated parts) is also a problem. Residual coating particles take up their position or are combusted during the flaming and cause distinct pinholes and craters to be formed, the avoidance of which requires additional technical effort.

The corona pretreatment is widespread particularly for the pretreatment of polyolefin films or sheets to bring about the adhesion to adhesives or printing inks. Since the adhesion effect apparently is based on unstable bonds and declines after a short time, it is necessary to coat soon after the corona process.

With the plasma pretreatment, local adhesion disorders of the coating can occur and are attributed to insufficient contact of the surfaces with plasma. This pretreatment has found only limited application because of the high cost of the method. Chemical etching, for example by the chromic acid dipping process, admittedly brings about a great improvement in adhesion. However, problems of treatment of contaminated water arise.

It is a common feature of all the methods that they must be carried out as an additional step in the production of the finished polyolefin article. Particularly in the automobile sector, elastomer-modified polypropylenes (TPO) have been used increasingly in recent years. They are on the market as reactor blends (see Kunststoffe, 82, (1992) 6, pages 499–501, Polypropylene Reactor Blends, H. Schwager) as well as extruder blends and are used as functional parts, such as bumpers, spoilers, sun visors, mirror housings, etc. With that, the desire for the problem-free coatability of such molded parts comes into prominence. A survey of the common methods employed at the present time for the pretreatment of polypropylene blends before they are coated is given in the article: "Problemlösungen beim Lackieren von Polypropylene-Blends" (Solutions for the Problems of Coating Polypropylene Blends), Ch. Gruner, B. Rapp, H. J. Zimmermann, Kunststoffe, 82, (1992), 9, pages 802–806. The solutions for the problem, described here, also always contain a physical-chemical treatment of the surface of the finished molded article and, with that, an additional step in the process before the actual coating.

It has now been found that the problems described are avoided, if special additives are incorporated during the processing of the polyolefins either during the compounding or directly during the injection molding over the melt before the molding.

OBJECT OF THE INVENTION

An object of the present application are polyolefins, polyolefin blends and elastomer-modified polyolefins (TPO's) with increased surface polarity.

Another object of the present invention is a method of preparing the inventive polyolefins, polyolefin blends and elastomer-modified polyolefins with a polar surface. Yet another object of the invention is a method of preparing the molded articles and semi-finished products with increased surface polarity.

To increase the surface polarity, the inventive polyolefins, polylefin blends and elastomer-modified polyolefins contain as additives AB block copolymers of the general formula

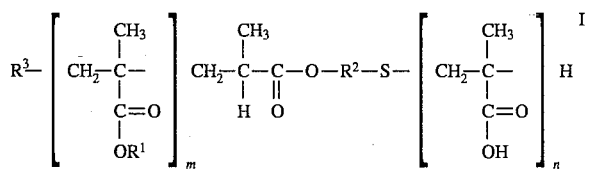

wherein $R^1$ groups are same or different and represent alkyl groups with 1 to 8 carbon atoms, with the exception of the t-butyl group, $R^2$ groups are $—(CH_2)_p$ groups, in which p is a number from 2 to 6, $R^3$ group is a known chain-length regulator, which is free of active hydrogen atoms, and n and m are the same or different and in each case have an average numerical value of not less than 3.

Preferably, $R^1$ is an alkyl group, with the exception of the t-butyl group, with 1 to 8 carbon atoms, $R^2$ is the $-(CH_2)_2-$ group, $R^3$ is the $C_{12}H_{25}S-$ group, and n and m preferably have a numerical value of 4 to 100. The methyl, ethyl, butyl or 2-ethylhexyl group is particularly preferred for $R^1$. Preferably, the block copolymers are contained in amounts of 0.1 to 10% by weight and particularly of 1 to 3% by weight.

Yet another object of the application are polyolefins, polyolefin blends and elastomer-modified polyolefins, containing block copolymers of the general, average formula

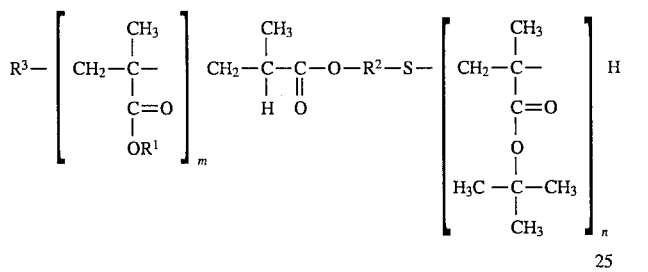

wherein the groups and subscripts have the meanings already given.

$R^3$ is a known chain-length regulator and is free of active hydrogen atoms. Examples of chain-length regulators are mercaptans, chloroform and isopropyl-benzene. An example of such an $R^3$ group, which has originated from a chain-length regulator, is the $C_{12}H_{25}S-$ group. Further examples of groups, which originate from chain-length regulators, are the group derived from t-dodecylmercaptan and the octadecylmercaptan and tetradecylmercaptan groups.

An example of these products is:

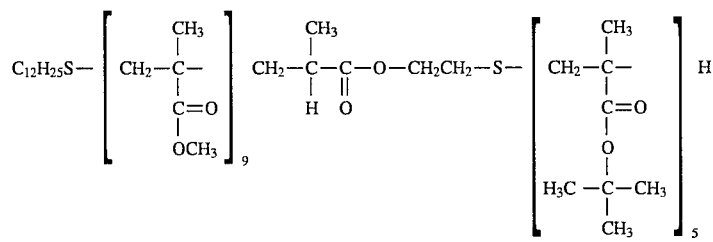

These block copolymers are synthesized by transesterifying polymers of the general formula

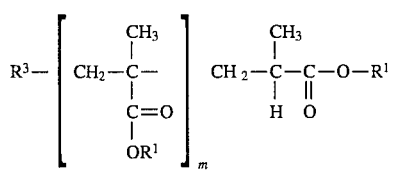

in which the groups and subscripts have the meanings already given, with polymers of the general formula

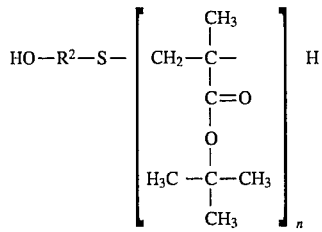

in the molar ratio of 1.1:1 to 1:1.1 with the addition of known catalysts.

II

A further object of the application is a method for preparing polyolefins, polyolefin blends and elastomer-modified polyolefins with increased surface polarity, which is characterized in that the polyolefins, polyolefin blends and elastomer-modified polyolefins, which contain the block copolymers of the aforementioned, general average formula II, are heated to a temperature of above about 160° C.

In so doing, isobutene is split off and products of the following structure are formed:

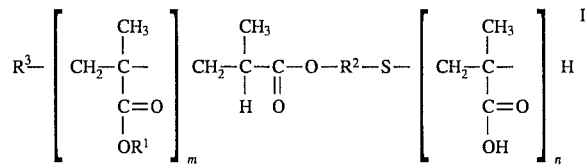

The groups and subscripts have the meanings already given.

It is not necessary for 100% of the isobutene groups to be split off in order to achieve the desired effect of increasing the surface polarity.

The following are named as examples:

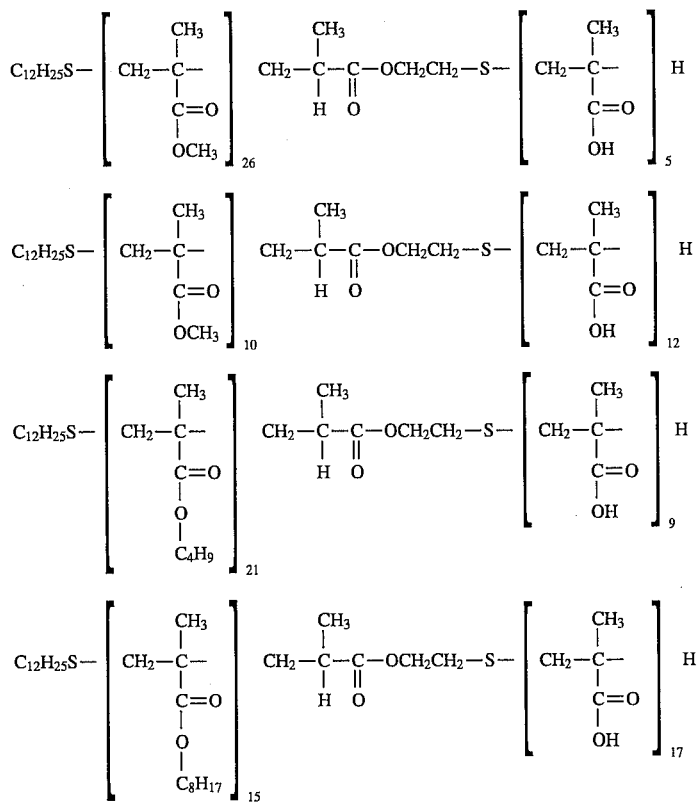

It is, however, also conceivable that, after the isobutene is split off, the adjacent carboxyl groups react further to form anhydride groups, water being split off in the process.

Another object of the invention is a method for producing polyolefin articles of increased surface polarity by processing polyolefins, polyolefin blends and elastomer-modified polyolefins, which contain the block copolymers of the aforementioned, general formula II, into molded articles, hollow tubes, sheets, films and semi-finished products, wherein, as described above, the corresponding carboxylic acid derivative of the general formula I is formed in situ by splitting off isobutene.

SUMMARY OF THE INVENTION

Preferably, block copolymers of the general formula II are incorporated into the melt of the polyolefins, polyolefin blends and elastomer-modified polyolefins before the molding process and the melt is molded in the usual manner by, for example, injection molding, blow molding or extrusion.

A different possibility consists of using the additives in the form, in which they are obtained after the isobutene is split off (see formula I). Depending on the type and morphology of the polyolefin, the use of the free form of the additive may in some cases be more advantageous than that of the protected form.

Since practically any commercial polymer consists of the basic polymer and a series of additives, such as antioxidants, UV stabilizers, heat stabilizers, lubricants and processing aids, the block copolymer, which is added pursuant to the invention, can be added together with these additives.

No additional technical equipment is required for this purpose, since the polymers can be processed in the usual manner on extruders, kneaders or rollers.

An additional processing step is therefore not required.

The additives were used and tested in the following steps:
1. Compounding

A 10% master batch of the block copolymer additive in elastomer-modified polypropylene (TPO) is prepared on a laboratory roll mill at a roll temperature of 180° C. in such a manner that the additive is added in portions to the plastic melt within 10 minutes. A homogeneous rolled sheet compound results, which is cooled to 130° C., taken from the roller and then, after it has cooled down completely, comminuted in an impeller breaker.

2. Injection Molding

The TPO master batch is mixed in accordance with the particularly preferred additive concentration of 1% to 3% by weight with the TPO without additive and processed on an injection molding machine at 250° C. into 8 cm×6 cm plates. After the injection molding process, the plates are kept for at least 2 days, before they are treated further.

3. Pretreatment and Coating 3.1 Pretreatment

In some cases, the test pieces are subjected to a pretreatment (power wash), which simulates practical conditions as follows:
a. Pre-washing by spraying at a pressure of 1 bar with 70° C. hot washing solution;
b. Rinsing with town water
c. Rinsing with fully deionized water;
d. Blowing adhering water off; and
e. Drying for 35 minutes at 85° C.

3.2 Coating

Two coating layers are applied by spraying:
a. Priming: 2-component polyurethane coating such as: Herberts: primer 47645/hardener 47643; mixing ratio 100:40; diluent: 11098; and drying: 25 minutes at 85° C. The thickness of the dry primer layer is 15 to 20 μm.

b. Covering coating: 2-component polyurethane coating such as: Herberts: Tornado red/hardener 10044; mixing ratio 100:33; diluent: 11171; venting: 10 minutes at room temperature; and drying: 40 minutes at 85° C. The thickness of the dry covering coating is 30 μm.

After the coating, the plates are kept for 1 day at room temperature, 2 days at 50° C. and, once again, for 1 day at room temperature, before the adhesion of the coating is tested.

4. Testing the Coating a. Cross cutting according to DIN 53151 Rating: Gt 0 (very good)—Gt 4 (≧65% delamination of the coating)

b. Vapor-jet test (based on Mercedes-Benz vapor test) A St. Andrews cross is scored with a knife at an angle of 70° in the coated plates A vapor-jet instrument, made by the Kaercher Company (HDS 590 C), is used with the 25045 nozzle.

Vapor jet conditions:

pressure: 80 bar;

temperature: 58° C.; and distance from the test piece: 12 cm

Position of the spraying jet: along a cutting line at an angle of 90° to the sample surface; and duration of test: 20 seconds.

rating: 0 (very good)–5 (deficient)

The following Examples are provided by way of illustration and not by way of limitation.

EXAMPLES

AB block copolymer additives

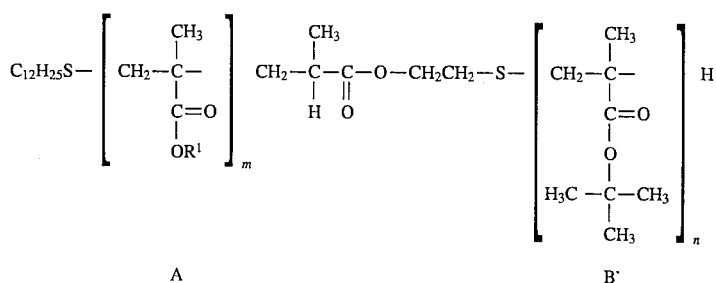

A                                                   B·

| Additive | $R^1$ | Segment $M_n$ | | | |
|---|---|---|---|---|---|
| | | Block A | | Block B | |
| | | $M_n$ | m | PTBMA* $M_n$ | n |
| 1 | Me | 1100 | 11 | 1300 | 9 |
| 2 | Me | 2600 | 26 | 1300 | 9 |
| 3 | Me | 2600 | 26 | 600 | 4 |
| 4 | Bu | 1000 | 7 | 1000 | 7 |
| 5 | Bu | 3000 | 21 | 600 | 4 |

*PTBMA = poly(t-butyl methacrylate)
Me = methyl
Bu = butyl

| Formulations and the Results of Testing the Coating | | | | | | | | |
|---|---|---|---|---|---|---|---|---|
| Compound | Compound Name | | | | | | | |
| Components | A | B | C | D | E | F | G | H |
| Hifax Exp. | 100 | 100 | 100 | 100 | 100 | — | — | — |
| 5124* (Himont) | | | | | | | | |
| Novolen 2800 JX* (BASF) | — | — | — | — | — | 100 | 100 | 100 |
| Additive 1 | — | 1.5 | 3.0 | — | — | — | — | — |
| Additive 2 | — | — | — | 2.0 | — | — | — | — |
| Additive 3 | — | — | — | — | — | — | 1.5 | — |
| Additive 4 | — | — | — | — | 3.0 | — | — | — |
| Additive 5 | — | — | — | — | — | — | — | 3.0 |
| Prewashing Coating test | — | — | — | + | + | + | — | + |
| Cross cut (DIN 53 151) | Gt3 | Gt1 | Gt0 | Gt0 | Gt1 | Gt4 | Gt1 | Gt1 |
| Vapor-jet test | 5 | 0–1 | 0 | 0 | 0–1 | 4 | 0–1 | 1 |

*PP/EPDM

As can be seen from the above Table, the adhesion of coatings on the elastomer-modified polypropylenes, mentioned in these Examples, when compared with the standard (compound A or F), can be improved clearly in the crosscut test as well as in the vapor-jet test through the use of the inventive AB block copolymers. The good adhesion is explained by an interaction between the carboxyl groups and the basic centers in the coating.

The polyolefin articles, obtained pursuant to the invention, are furthermore distinguished by a very good printability and permanence of the material printed on them.

What is claimed is:

1. Polyolefins, polyolefin blends and elastomer-modified polyolefins, having a polar surface, wherein the surface polarity is imparted by an AB block copolymer of a formula $$R^3-\left[\begin{array}{c}CH_3\\|\\CH_2-C-\\|\\C=O\\|\\OR^1\end{array}\right]_m \begin{array}{c}CH_3\\|\\CH_2-C-C-O-R^2-S-\\|\ ||\\H\ O\end{array} \left[\begin{array}{c}CH_3\\|\\CH_2-C-\\|\\C=O\\|\\OH\end{array}\right]_n H$$

wherein $R^1$ groups are same or different and represent alkyl groups with 1 to 8 carbon atoms, with the exception of the t-butyl group;

$R^2$ groups are $-(CH_2)_p$ groups, in which p is a number from 2 to 6;

$R^3$ group is a chain regulator, and is free of active hydrogen atoms; and n and m are same or different and in each case have an average numerical value of not less than 3.

2. Polyolefins, polyolefin blends and elastomer-modified polyolefins of claim 1, wherein $R^1$ is an alkyl group with 1 to 8 carbon atoms;

$R^2$ is —$(CH_2)_2$— group;

$R^3$ is $C_{12}H_{25}S$— group; and n and m have a numerical value of 3 to 100.

3. Polyolefins, polyolefin blends and elastomer-modified polyolefins of claim 2, wherein $R^1$ is methyl, ethyl, butyl or 2-ethylhexyl group.

4. Polyolefins, polyolefin blends and elastomer-modified polyolefins of any of claims 1, 2 or 3, wherein the block copolymers are present in an amount of about between 0.1 to 10% by weight of said polyolefins, polyolefins blends and elastomer-modified polyolefins.

* * * * *